United States Patent [19]
Byrnes et al.

[11] Patent Number: 5,449,152
[45] Date of Patent: Sep. 12, 1995

[54] TUBULAR ELASTOMER DAMPER

[75] Inventors: Francis E. Byrnes, White Plains, N.Y.; Lawrence I. Cullen, III, North Haven, Conn.

[73] Assignee: United Technologies Corporation, Hartford, Conn.

[21] Appl. No.: 241,456

[22] Filed: May 11, 1994

Related U.S. Application Data

[63] Continuation-in-part of Ser. No. 995,875, Dec. 23, 1992, abandoned.

[51] Int. Cl.$^6$ .......................... F16F 1/36; B60G 11/22
[52] U.S. Cl. .................. 267/153; 267/141.1; 267/293; 267/294
[58] Field of Search ................ 267/71, 74, 141, 141.1, 267/153, 294, 35, 141.2, 141.3, 141.4, 293; 416/134 A, 140 A, 106, 107; 244/17.27

[56] References Cited

U.S. PATENT DOCUMENTS

| | | |
|---|---|---|
| 3,504,905 | 1/1970 | Irwin . |
| 3,589,835 | 6/1971 | Linden . |
| 3,606,295 | 10/1971 | Appleton . |
| 3,610,610 | 3/1971 | Chassagne . |
| 3,679,197 | 7/1972 | Schmidt . |
| 3,806,106 | 10/1974 | Hamel et al. . |
| 3,831,920 | 8/1974 | Meldrum et al. ............... 267/141 X |
| 3,842,945 | 10/1974 | Potter . |
| 3,952,546 | 4/1976 | Nakano et al. . |
| 3,999,887 | 12/1976 | McGuire . |
| 4,040,690 | 11/1977 | Finney . |
| 4,097,193 | 9/1978 | Brünsch et al. . |
| 4,105,266 | 8/1978 | Finney . |
| 4,108,508 | 10/1978 | Clinard, Jr. . |
| 4,121,813 | 8/1978 | Inuzuka . |
| 4,129,403 | 7/1978 | Watson . |
| 4,135,856 | 6/1979 | McGuire . |
| 4,182,138 | 5/1980 | McGuire . |
| 4,244,677 | 4/1981 | Noehren et al. . |
| 4,249,862 | 2/1981 | Waddington et al. . |
| 4,256,354 | 3/1981 | Peterson . |
| 4,257,739 | 3/1981 | Covington et al. . |
| 4,286,827 | 9/1981 | Peterson et al. ............. 267/141.1 X |
| 4,297,078 | 3/1981 | Martin . |
| 4,304,525 | 12/1981 | Mouille . |
| 4,349,184 | 9/1982 | Peterson et al. . |
| 4,360,337 | 11/1982 | Frommlet et al. . |
| 4,407,633 | 10/1983 | Mouille . |

(List continued on next page.)

FOREIGN PATENT DOCUMENTS 421864 4/1991 European Pat. Off. ......... 267/141.1

OTHER PUBLICATIONS

"Elastomeric Bearing Application to Helicopter Tail Rotor Designs" C. H. Fagan Jan. 1968 pp. 13-23.

Primary Examiner—Robert J. Oberleitner
Assistant Examiner—Kevin D. Rutherford
Attorney, Agent, or Firm—McAulay Fisher Nissen Goldberg & Kiel

[57] ABSTRACT

A tubular elastomer damper has a central shaft disposed within a housing and surrounded by an elastomer member. Uniform strain is provided across the elastomer disposed between the central shaft and the housing by either tapering the length of the elastomer from an inner to an outer bonding surface such that the radius times the length at each point along the elastomer is equal or by providing a first elastomer layer adjacent the shaft having a high fatigue strain/lower damping ability, a second elastomer layer adjacent the housing having a low strain higher damping ability and an intermediate elastomer layer of moderate strain and damping therebetween such that from the inner to the outer radius of the elastomer member, uniform strain is achieved. By providing uniform strain from the inner to the outer radius of the tubular elastomer damper, temperature increases due to localized high strains are avoided which are detrimental to damper performance. Optionally, axial cooling passages are provided within the elastomer member to dissipate heat to assure operation within design parameters, thus extending the life of the tubular elastomer damper.

19 Claims, 4 Drawing Sheets

U.S. PATENT DOCUMENTS

| | | |
|---|---|---|
| 4,522,563 | 6/1985 | Reyes et al. . |
| 4,566,677 | 1/1986 | Le Pierres . |
| 4,575,358 | 3/1986 | Ferris . |
| 4,580,945 | 5/1986 | Miller . |
| 4,588,356 | 1/1986 | Pariani . |
| 4,639,193 | 3/1987 | Reichert et al. . |
| 4,652,210 | 10/1987 | Leman et al. . |
| 4,676,669 | 6/1987 | Byrnes et al. . |
| 4,690,616 | 1/1987 | Hahn et al. . |
| 4,778,343 | 4/1988 | Hahn et al. . |
| 4,804,352 | 2/1989 | Schmidt . |
| 4,815,937 | 3/1989 | Aubry et al. . |
| 4,859,148 | 8/1989 | Hibyan . |
| 4,874,292 | 5/1989 | Matuska et al. . |
| 4,877,375 | 10/1989 | Desjardins . |
| 4,886,419 | 12/1989 | McCafferty . |
| 4,893,988 | 1/1990 | Sato . |
| 4,895,354 | 1/1990 | Byrnes . |
| 4,915,585 | 4/1990 | Guimbal . |
| 4,930,983 | 6/1990 | Byrnes et al. . |
| 4,958,812 | 9/1990 | Wolf et al. ............... 267/140.3 X |
| 4,961,687 | 10/1990 | Bost et al. . |
| 4,986,735 | 1/1991 | Robinson . |
| 5,031,885 | 7/1991 | Schwerdt ..................... 267/141.2 |
| 5,092,738 | 3/1992 | Byrnes et al. . |
| 5,188,513 | 2/1993 | Byrnes ........................ 416/134 A |

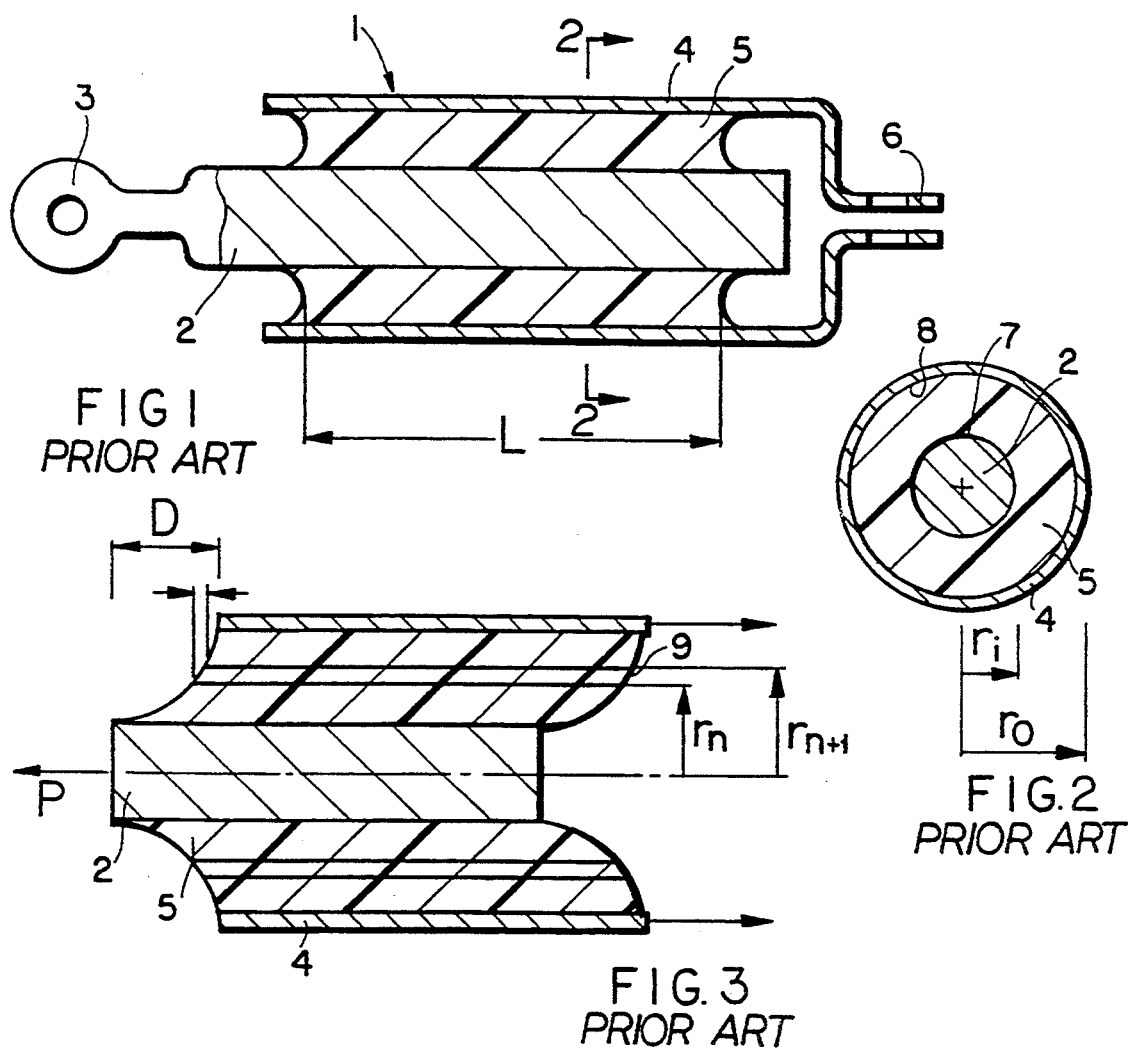
FIG 1 PRIOR ART
FIG. 2 PRIOR ART
FIG. 3 PRIOR ART
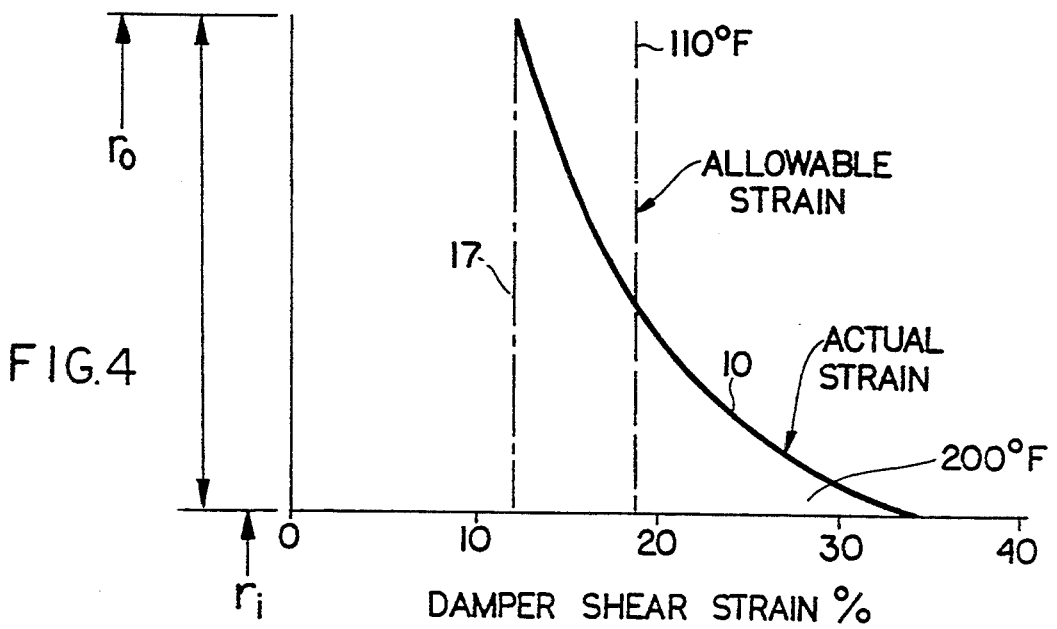
FIG. 4

TUBULAR ELASTOMER DAMPER

This is a continuation-in-part, of application Ser. No. 07/995,875, filed Dec. 23, 1992, now abandoned.

TECHNICAL FIELD

This invention relates to dampers suited for use in a rotor system of a helicopter aircraft and more particularly to a tubular elastomer damper having uniform strain from an inner to an outer surface of the elastomer, to minimize loss of damping properties.

BACKGROUND

The rotor head of a helicopter typically includes means for articulating one or more blades through flapping, lag and pitch motions. To dampen the angular lag oscillations of the blades, resilient braces with viscoelastic, hydraulic or other damping means are used, typically referred to as lead/lag dampers. These are usually interposed between a peripheral edge of a rotor hub to which each blade is connected and the blade root.

One such damper incorporates a piston cylinder arrangement having hydraulic fluid disposed between a pair of chambers separated by an orifice. As the blade twists fore and aft (leads and lags) about a vertical hinge or axis, the fluid is driven to pass through the restrictive orifice at a controlled rate thus damping the lead/lag effect. However, such dampers are expensive to manufacture and lose damping ability if oil leakage occurs.

Another type of damper relies on a plurality of elastomer laminates which dissipate energy through shear deformation. Such a damper is shown in FIG. 1. The damper has a central shaft having a lug for attachment to a first structure such as a blade. A portion of the shaft has an elastomer laminate firmly bonded to it. A cylindrical housing envelops the elastomer laminate and extends axially with means for attachment to a second structure such as a rotor hub. For example, the central shaft may mount to the rotor hub and the housing may mount to the leading or trailing edge of the rotor blade. As the damper cycles in accordance with the lead lag oscillations, the elastomer laminate undergoes non-uniform shear strain, with the highest strain at the interface of the elastomer and shaft. Strains over 20% cause a temperature increase within the elastomer which may exceed 200° F. The result is a significant loss of damping properties at the point of highest strain which can lead to erratic damping effectiveness and damper failure.

SUMMARY OF THE INVENTION

This invention has as its object the provision of a tubular elastomer damper which provides uniform strain across the elastomer layer to minimize thermal effects. An additional object is to provide means for cooling the damper to further assure that the damper maintains its design damping qualities during operation.

These and other objects of the present invention are achieved by providing a tubular elastomer damper having a central shaft, an outer housing surrounding a portion of the central shaft and an elastomer member disposed therebetween, the elastomer member having a first bonding surface interface with the central shaft and a second bonding surface interface with the housing. The elastomer member has tapered end surfaces between the shaft and the housing such that the bonded surface along the housing interface has an equivalent area to the interface with the central shaft to provide uniform strain across the elastomer. Such a damper minimizes localized heating and non-uniform loss of damper properties. Preferably, means are also provided for cooling the damper. For example, passages extend axially within the elastomer member, the passages allowing air to flow through the damper to provide cooling and minimize temperature increases. Minimizing thermal effects by providing uniform strain and/or cooling means increases the useful life of the damper and assures optimum performance.

In an alternative embodiment of the present invention, the damper has an elastomer member composed of radially oriented axial laminates produced of generally increasing stiffness from an inner radius to an outer radius of the elastomer member. Preferably, a lower damping/higher fatigue strain elastomer layer is located adjacent the shaft and a higher damping/lower fatigue strain elastomer layer is located adjacent the housing, with a moderate damping and fatigue strain elastomer layer disposed therebetween. Thus, uniform radial strain is obtained by using materials with selected properties to minimize localized heating and loss of damping properties. Cooling passages are again optionally included to optimize damper performance.

BRIEF DESCRIPTIONS OF THE DRAWINGS

FIG. 1 is a cross-sectional view of a prior art damper.

FIG. 2 is a cross-sectional view taken along line 2—2 of FIG. 1.

FIG. 3 is a view of the prior art damper of FIG. 1 shown in the deformed condition.

FIG. 4 is a graph illustrating the strain from the inner to the outer radii of an elastomer damper.

DETAILED DESCRIPTION OF THE INVENTION

Figure 5:
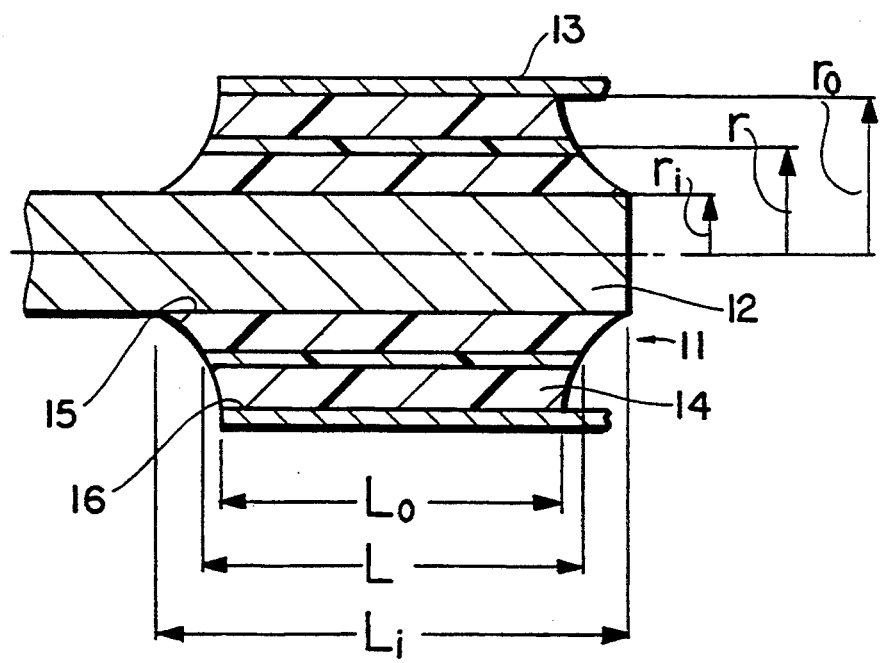
FIG. 5 is a cross-sectional view of a damper produced according to the present invention.

Referring to FIG. 1, a prior art elastomer damper 1 is shown. The damper 1 has a central shaft 2, with a lug 3 for connecting to a structure (not shown), such as a rotor hub. A metal housing 4 surrounds a portion of the shaft 2 with a space therebetween filled with an elastomer member 5 which may be composed of a single unitary elastomer layer or be produced as a plurality of bonded laminate plys composed of a common elastomer, such as natural or synthetic rubber. The member optionally includes one or more cylindrical shims between plys to increase axial stiffness. The housing 4 has an attachment end 6 for connecting to an adjacent structure such as a rotor blade (not shown).

Referring to FIG. 2, a view taken along line 2—2 of FIG. 1, the elastomer member 5 is bonded to the shaft 2 at an interface 7 by adhesives or other means. The elastomer member is also similarly bonded to the housing 4 at an interface 8. The thickness of the elastomer is determined by subtracting the outer radius $r_o$ from the shaft radius $r_i$.

Referring to FIG. 3, a cross sectional view of the tubular elastomer damper of FIG. 1 is shown, subject to deformation (D). For purposes of analysis, an incremental layer 9 at an intermediate location is designated as being between $r_n$ and $r_{n+1}$. The axial stiffness $K_z$ of the incremental damper layer is equal to the modulus of elasticity of the elastomer (G) times the surface area (A) divided by the thickness of the layer (dr), in accordance with the following formula I:

$$K_z = \frac{GA}{dr} = \frac{2\pi GL}{\ln \frac{r_n + 1}{r_n}} \qquad \text{I.}$$

The elastomer shear strain is equal to the elastomer displacement divided by the difference in radius in accordance with formula II:

$$\text{Shear Strain} = \frac{D}{dr} = \frac{P \ln \frac{r_n + 1}{r_n}}{2\pi(r_o - r_i)GL} \qquad \text{II.}$$

where P is the force applied, G is the modulus of elasticity, and L is the length of the layer.

Referring to FIG. 4, line 10 shows that the shear strain varies considerably from the inner radius, $r_i$ (approx. 35%) to the outer radius, $r_o$ (approx. 13%) with the strain adjacent to the inner radius exceeding the allowable strain value of about 19% at 110° F. The strain causes localized heating of the elastomer to approximately 200° F. which further degrades the damping properties of the elastomer. Such high localized strain, acting on the bonded interface 7, could cause separation and damper failure.

Referring to FIG. 5, a damper 11 produced according to the present invention is shown. The damper 11 has a central shaft 12, an outer housing 13, and an elastomer member 14 disposed therebetween. The elastomer member may be composed of a single unitary elastomer layer or be produced as a plurality of bonded laminate plys composed of a common elastomer such as natural or synthetic rubber. The member optionally includes one or more cylindrical shims between plys to increase axial stiffness. However, the length (L) of the elastomer at the inner and outer interface bonding surfaces 15 and 16 respectively differ such that $r_iL_i$, will equal $r_oL_o$, and that at any intermediate position, $r_n L_n$ will equal $r_iL_i$ and $r_oL_o$. This is accomplished by tapering either one or both end walls of the elastomer layers to change L.

$$\text{Thus, } L_o = \frac{r_iL_i}{r_o} \text{ and } L_n = \frac{r_iL_i}{r_n}$$

Accordingly, uniform strain is provided at each radius from the inner to the outer surfaces and the resilient member will be equally strained under compression and axial loading, maintaining the elastomer damper from the inner and outer radius within the allowable strain limitations of the material. Such a uniform strain is illustrated in FIG. 4 by line 17. By obtaining uniform strain, temperature effects at the interface between the shaft and elastomer member surface are minimized.

Figure 6:
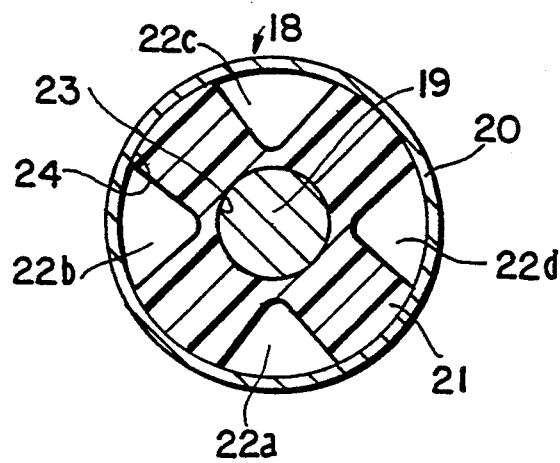
FIG. 6 is a cross-sectional view of an alternative embodiment of the damper of FIG. 5, including cooling passages.

Referring to FIG. 6, an alternative embodiment of the present invention is shown. A damper 18 has a central shaft 19 an outer housing 20, an elastomer member 21 and further includes four passages 22a–d which extend axially through the elastomer. Each passage reduces the amount of elastomer but notably maintains a full continuous shaft to elastomer interface 23, though with a reduced housing to elastomer interface 24. The area to area equivalence is still maintained by subtracting the open area at the outer interface, when calculating the equivalent surface areas.

The passages 22 are tapered to provide a constant cross sectional area between the inner and outer radius throughout the tubular elastomer material so that the incremental axial stiffness is constant, again producing a uniformly strained tubular elastomer damper. The product of the radius and the length of each incremental layer is still constant, which continues to produce a damper insuring uniform strain. In addition, air is free to circulate through the damper, to remove heat generated by damper oscillations, to further improve damper efficiency.

The cooling passages may be provided by locating the central shaft in the housing, incorporating structures in the shape of the passages within the space between the shaft and housing, and utilizing a flowable elastomer material to fill the void spaces between the shaft and the housing. The shaped structures are then removed to provide the cooling passages. Of course, other means for providing the passages such as by drilling or machining may be used though these are somewhat more labor intensive.

Figure 7:
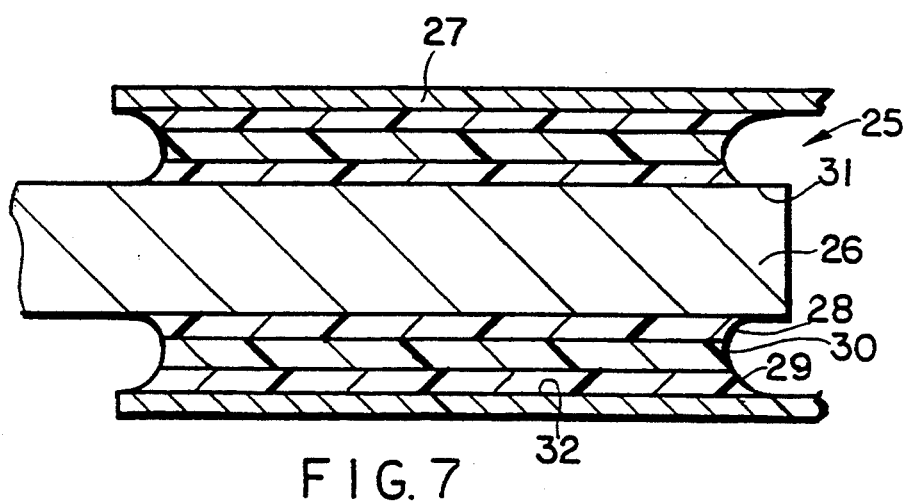
FIG. 7 is a cross-sectional view of an alternative embodiment of the damper of the present invention.
Figure 7A:
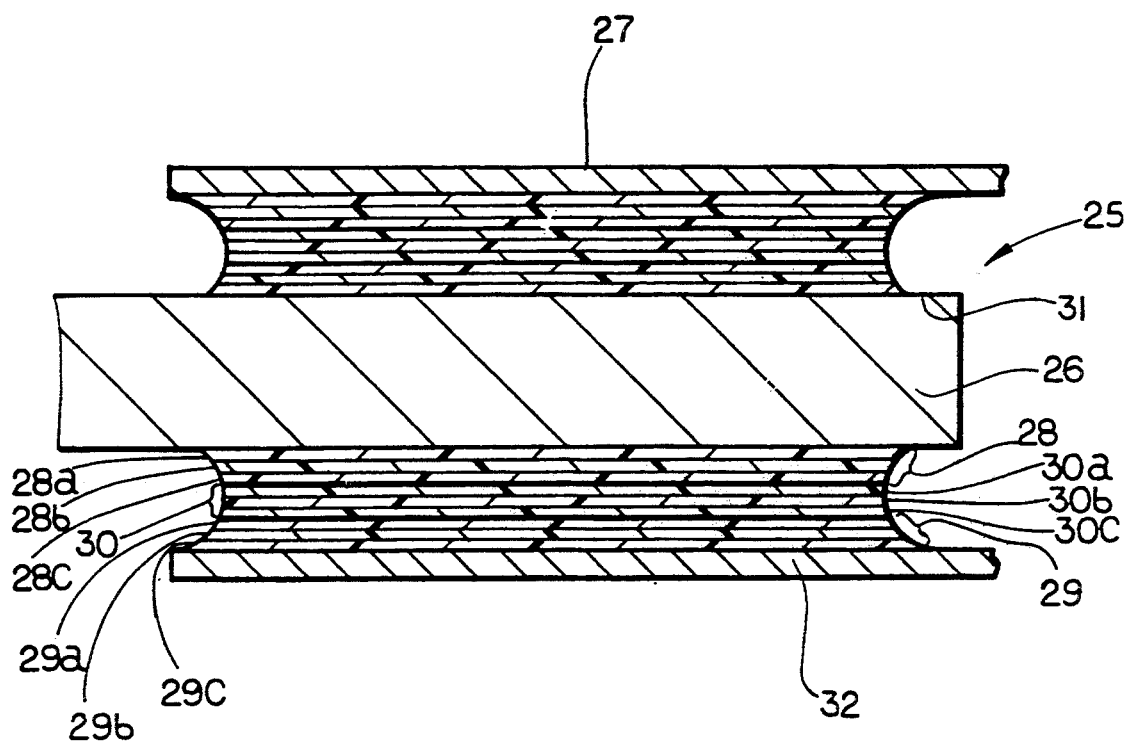
FIG. 7a is a cross-sectional view of the alternative embodiment having multiple plys.

Referring to FIG. 7, an alternative embodiment of the present invention is shown. A damper 25 has a central shaft 26 and a housing 27, as previously described. However, rather than including an elastomer member made of a single elastomer between the inner and outer radii of the damper, three discrete elastomer layers 28, 29 and 30 are used. As shown in FIG. 7a, each of the elastomer layers 28, 29 and 30 can be composed of a plurality of laminate plys, 20a–20c, 29a–29c, and 30a–30c, each layers plys having the same modulus of elasticity.

The first layer 28 is composed of a material having lower damping/higher fatigue strain elastomer properties and thus has a relatively high modulus of elasticity. Preferably, a material having a shear modulus of 50–300, fatigue strain of about 0.35 and a damping loss factor of about 0.1 should be used.

The second layer 29 is disposed adjacent to the housing, and is composed of a higher damping/lower fatigue stain elastomer material having a lower modulus of elasticity. Preferably, a material having a shear modulus of 50–300, fatigue strain of about 0.08 and a damping loss factor of about 0.6 should be used.

The intermediate layer 30 is composed of an elastomer which has moderate damping and fatigue strain properties. Preferably, a material having a shear modulus of 50–300, fatigue strain of about 0.13 and a damping loss factor of about 0.4 should be used.

Each of the materials is selected to have damping properties which will allow uniform strain to be obtained from the inner to the outer radius, i.e., from a bonding interface 31 on the shaft to the bonding interface 32 on the housing. Thus, the damper shear strain would be in accordance with line 17 of FIG. 4.

In a preferred embodiment of the invention, the first layer is composed of a blend of natural and synthetic rubbers, about 75-90% natural rubber and most preferably 85% natural rubber, 15% synthetic rubber, such as polybutadiene. The intermediate layer is composed of synthetic rubber or a blend of from 75 to 90% synthetic rubber, 25-10% natural rubber. Among the synthetic rubbers usable are polybutadiene, polybutyl and butyl rubbers. The outer layer is preferably composed of silicone. Such a damper may be produced by bonding the first layer to the shaft, bonding the second layer to the housing, assembling the shaft and housing in proximity to each other and filling the void between the elastomer layers with the intermediate material. Such manufacturing techniques are well known in the art.

Figure 8:
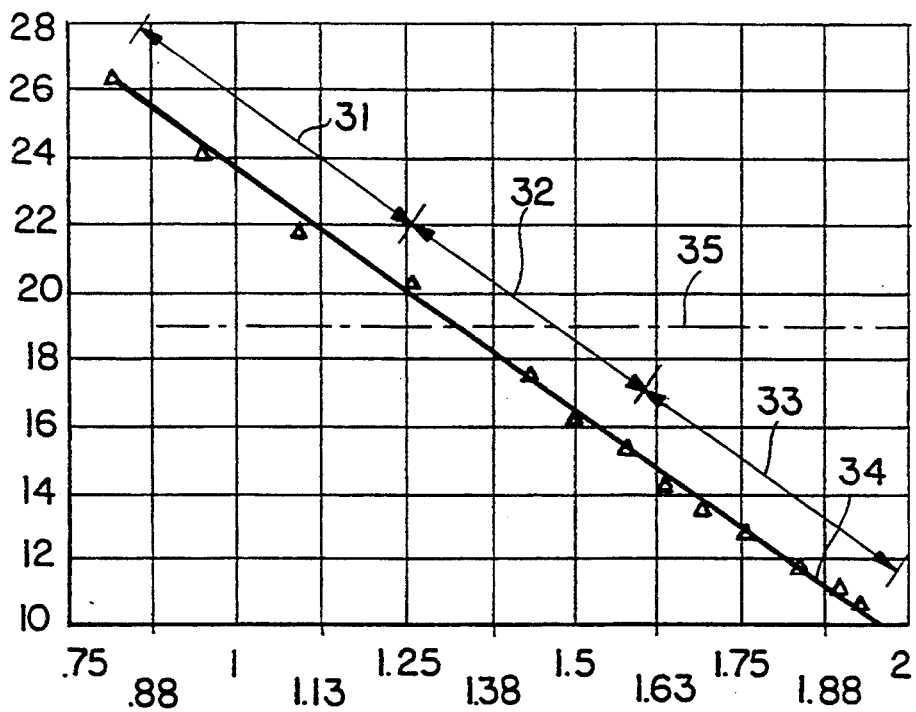
FIG. 8 is a graph illustrating the inventive damper undergoing various degrees of strain, as a function of radial distance for a given damper displacement.

Referring to FIG. 8, a graph of strain versus radius has a first line 31 corresponding to the first layer 28 which extends from about 0.88 to 1.25". A second line 32 corresponds to the intermediate layer, extending from 1.25 to approximately 1.60", and a third line 33 corresponding to the second layer, extending from 1.60 to approximately 2". Line 34 shows the prior art strain to distance relationship and line 35 shows the strain to distance relationship for the elastomer damper produced in accordance with the embodiment of FIG. 7.

As described previously, a plurality of cooling passages is optionally incorporated within an elastomer damper to provide air cooling to minimize the potential for thermal effects which may be detrimental to the damping properties of the elastomer. Where the elastomer damper utilizes a plurality of laminate plys, it is typical to include cylindrical metal shims between the elastomer plys to increase axial stiffness to resist bending moments.

Figure 9:
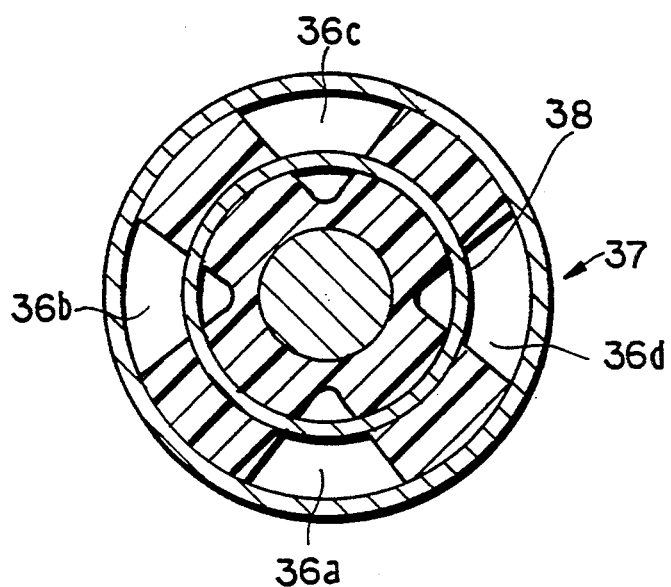
FIG. 9 is a cross-sectional view of an alternative embodiment of the present invention having cooling passages and incorporating a cylindrical shim which increases heat conduction from the elastomer into the air passages.

Referring to FIG. 9, four cooling passages 36a-d are provided within a tubular elastomer damper 37 produced according to either FIGS. 5 or 7. However, a cylindrical metal shim 38 is incorporated within the damper. While a single shim is shown, this is done for ease of illustration, and a plurality of such shims may be used. The shim extends circumferentially between the air passages and the elastomer. Since metal has a higher thermal conductivity than the damper elastomers, the shim acts as a heat sink in the elastomer and conducts heat into the air passage to provide an enhanced means for removing heat from the elastomer, in essence acting as a cooling fin. Consequently, a tubular damper provided according to the embodiment of FIG. 9 will have optimum thermal properties by minimizing temperature gradients, with operational damper characteristics close to the design optimum with an increase in useful life.

Utilizing the present invention, tubular elastomer dampers are provided which minimize localized strain and thus reduce the propensity for high temperature conditions to exist which are detrimental to the elastomer damping properties. Additionally, means are provided for removing heat from the damper to prevent, even where high strain conditions are encountered, the subsequent heat up of the elastomer with a resultant loss of damping properties. Consequently, tubular elastomer dampers produced in accordance with the invention have optimal damping properties and increased useful life.

While preferred embodiments of the present invention have been shown and described, it will be understood by those skilled in the art that various changes and/or modifications could be made without varying from the scope of the invention.

We claim:

1. A tubular elastomer damper comprising: a central shaft with means for attaching to a first structure, an outer housing surrounding a portion of the central shaft and having means for attaching to a second structure and an elastomer member disposed therebetween, the elastomer member having a first bonding surface interface with the central shaft and a second bonding surface interface with the outer housing, the first bonding surface interface having an area equal to the second bonding surface interface area, the elastomer member having a contoured end to change a length of the elastomer member at each increment from an inner to an outer radius thereof such that each radius at each increment from the inner to the outer radius of the elastomer member times each length of the elastomer at that increment equals the radius times the length of every other increment.

2. The tubular elastomer damper of claim 1 wherein the elastomer is composed of a material selected from the group consisting of natural rubber, synthetic rubber, silicone and blends thereof.

3. The tubular elastomer damper of claim 1 wherein the elastomer is composed of a material having a single modulus of elasticity.

4. The tubular elastomer damper of claim 1 wherein the elastomer is composed of a plurality of laminate plys, each ply having the same modulus of elasticity.

5. The tubular elastomer damper of claim 4 further comprising intermediate shims incorporated between the plurality of plys to provide resistance to bending moments.

6. A tubular elastomer damper consisting essentially of:
a central shaft with means for attaching to a first structure, an outer housing surrounding a portion of the central shaft and having means for attaching to a second structure, an elastomer member disposed therebetween and having a first elastomer layer bonded to the central shaft and being composed of a material having a relatively high modulus of elasticity, high strain and lower damping ability, a second elastomer layer bonded to the housing, being composed of a material having a lower modulus of elasticity, lower strain and high damping ability, and an intermediate elastomer layer disposed between and bonded to the first and second elastomer layers, the intermediate elastomer layer being composed of a material having moderate strain and moderate damping ability wherein uniform strain is provided from an inner to an outer radius of the elastomer member to minimize localized heating and loss of damping properties, each of the first, second and intermediate elastomer layers being composed of a plurality of laminate plys, each layer's plys having the same modulus of elasticity.

7. The tubular elastomer damper of claim 6 wherein the first elastomer is selected from the group consisting of natural rubber, synthetic rubber, silicone and blends thereof.

8. The tubular elastomer damper of claim 7 wherein the synthetic rubber is selected from the group consisting of butyl rubber, polybutyl rubber and polybutadiene.

9. The tubular elastomer damper of claim 6 wherein the second elastomer layer is made of silicone.

10. The tubular elastomer damper of claim 6 wherein the intermediate elastomer layer is selected from the group consisting of natural rubber, synthetic rubber, silicone and blends thereof.

11. The tubular elastomer damper of claim 6 wherein cylindrical metal shims are incorporated between the elastomer layers to provide resistance to bending moments.

12. The tubular elastomer damper of claim 6 wherein a plurality of axial through passages are provided within the elastomer sufficient to allow an cooling of the elastomer.

13. The tubular elastomer damper of claim 6 wherein the first layer has a shear modulus of 50-300, a fatigue strain of about 0.35 and a damping loss factor of about 0.1.

14. The tubular elastomer damper of claim 6 wherein the second layer has a shear modulus of 50-300, a fatigue strain of about 0.08 and a damping loss factor of about 0.6.

15. The tubular elastomer damper of claim 6 wherein the intermediate layer has a shear modulus of 50-300, a fatigue strain of about 0.13 and a damping loss factor of about 0.4.

16. The tubular elastomer damper of claim 6 wherein the intermediate layer is a blend of 75-90% synthetic rubber, 25-10% natural rubber.

17. A tubular elastomer damper comprising:
a central shaft with means for attaching to a first structure, an outer housing surrounding a portion of the central shaft and having means for attaching to a second structure, an elastomer member disposed therebetween and having a first elastomer layer bonded to the central shaft and having high strain and lower damping ability, a second elastomer layer bonded to the housing, having lower strain and high damping ability, and an intermediate elastomer layer disposed between and bonded to the first and second elastomer layers, the intermediate elastomer layer having moderate strain and moderate damping ability wherein uniform strain is provided from an inner to an outer radius of the elastomer member to minimize localized heating and loss of damping properties, cylindrical metal shims incorporated between the elastomer layers to provide resistance to bending moments, a plurality of axial passages being provided within the elastomer member to allow cooling air to flow through the elastomer member, the metal shims extending through the passages to conduct heat out of the elastomer member.

18. A method for providing a tubular elastomer damper having resistance to localized heating and loss of damping properties comprising:
providing a central shaft with means for attaching to a first structure;
providing an outer housing spaced away from and surrounding a portion of the central shaft and having means for attaching to a second structure;
placing an elastomer member between the central shaft and the housing;
contouring an end of the elastomer member to change the length of the elastomer member form an inner to an outer radius thereof such that the radius times the length of the elastomer is equal at each increment from the inner to the outer radius of the elastomer member.

19. A method for providing a tubular elastomer damper having resistance to localized heating and loss of damping properties consisting essentially of:
providing a central shaft with means for attaching to a first structure;
providing an outer housing spaced away from and surrounding a portion of the central shaft and having means for attaching to a second structure;
bonding a first elastomer layer to the central shaft, the first layer composed of a single material having high strain and lower damping ability and having a relatively high modulus of elasticity;
bonding a second elastomer layer to the housing, the second layer composed of a single material having lower strain and higher damping ability and having a lower modulus of elasticity; and
bonding an intermediate elastomer layer between the first and second elastomer layers to form an elastomer member, the intermediate layer composed of a single material having moderate strain and moderate damping ability wherein uniform strain is provided from an inner to an outer radius of the elastomer member.

* * * * *